United States Patent
Zhou

(10) Patent No.: US 8,510,579 B2
(45) Date of Patent: Aug. 13, 2013

(54) POWER SUPPLY SYSTEM WITH ENERGY-SAVING FUNCTION

(75) Inventor: Hai-Qing Zhou, Shenzhen (CN)

(73) Assignees: Hong Fu Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 337 days.

(21) Appl. No.: 13/090,162

(22) Filed: Apr. 19, 2011

(65) Prior Publication Data

US 2012/0239951 A1   Sep. 20, 2012

(30) Foreign Application Priority Data

Mar. 18, 2011 (CN) .......................... 2011 1 0065710

(51) Int. Cl.
*G06F 1/26* (2006.01)
(52) U.S. Cl.
USPC .......................................................... 713/320
(58) Field of Classification Search
USPC .......................................................... 713/324
See application file for complete search history.

(56) References Cited

U.S. PATENT DOCUMENTS

2012/0017103 A1*   1/2012   Abraham et al. ............. 713/320

OTHER PUBLICATIONS

Ned Mohan, Power Electronics, 2003, John Wiley & Sons, 3rd edition, part 1.*

* cited by examiner

*Primary Examiner* — Kim Huynh
*Assistant Examiner* — Austin Hicks
(74) *Attorney, Agent, or Firm* — Altis Law Group, Inc.

(57) ABSTRACT

A power supply system includes a power supply, a switch control circuit, a voltage rectifying circuit, and a trigger switch connected to the switch control circuit. The switch control circuit is connected between an alternating current (AC) power source and the power supply. The voltage rectifying circuit is connected between the AC power source and the switch control circuit to rectify an AC voltage into a direct current (DC) voltage to power the switch control circuit. When the computer system is powered off, the power supply fails to output a system voltage, and the trigger switch fails to be triggered, the switch control circuit disconnects the power supply from the AC power source. When the computer system is powered off, the power supply fails to output a system voltage, and the trigger switch is triggered, the switch control circuit connects the power supply to the AC power source.

8 Claims, 2 Drawing Sheets

US 8,510,579 B2

POWER SUPPLY SYSTEM WITH ENERGY-SAVING FUNCTION

BACKGROUND

1. Technical Field

The present disclosure relates to power supply systems, and particularly, to a power supply system with energy-saving function.

2. Description of Related Art

Nowadays, power supplies are widely used in electronic devices, such as computers. When a computer is turned off through software, a power supply in the computer still outputs a standby voltage to the motherboard of the computer for remote startup or turning on of the computer. However, if the computer is not used for a long time, the energy expended by the standby voltage is wasted.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
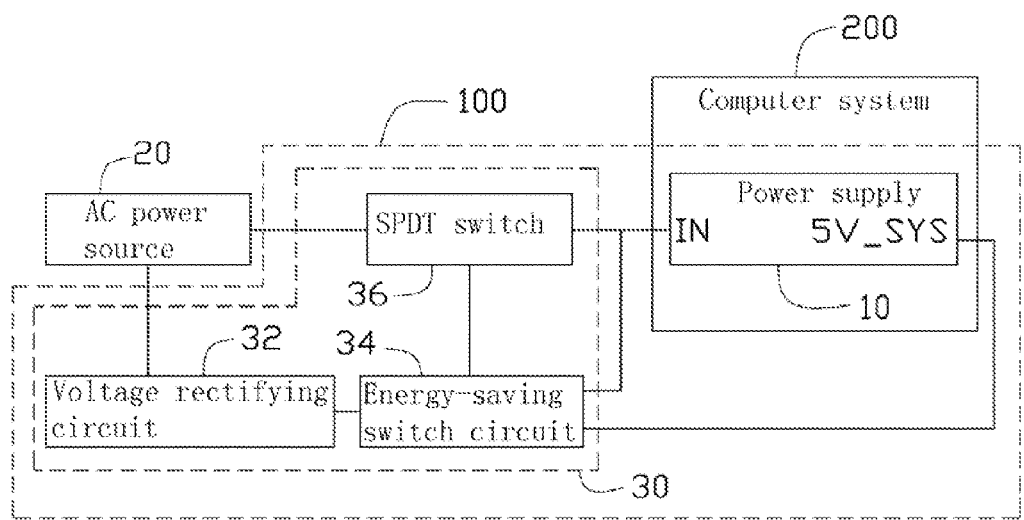
FIG. 1 is a block diagram of an exemplary embodiment of a power supply system connected to an external alternating current power source, the power supply system includes a energy-saving circuit.

Referring to FIG. 1, an exemplary embodiment of a power supply system 100 is used to save energy for a computer system 200 after the computer system 200 is turned off. The power supply system 100 includes a power supply 10 and an energy-saving circuit 30. The energy-saving circuit 30 is connected between the power supply 10 and an alternating current (AC) power source 20.

The energy-saving circuit 30 includes a voltage rectifying circuit 32, an energy-saving switch circuit 34, and a switch unit, such as a single-pole double-throw (SPDT) switch 36. The voltage rectifying circuit 32 is connected between the AC power source 20 and the energy-saving switch circuit 34, to rectify an AC voltage from the AC power source 20 into a direct current (DC) voltage, and output the DC voltage to the energy-saving switch circuit 34. The switch unit 36 is connected to the AC power source 20, an input terminal IN of the power supply 10, and the energy-saving switch circuit 34, to selectively connect the AC power source 20 to the input voltage terminal IN of the power supply 10 or connect the AC power source 20 to the energy-saving switch circuit 34. The input terminal IN of the power supply 10 is further connected to the energy-saving switch circuit 34. A system voltage output terminal 5V_SYS of the power supply 10 is connected to the energy-saving switch circuit 34.

Figure 2:
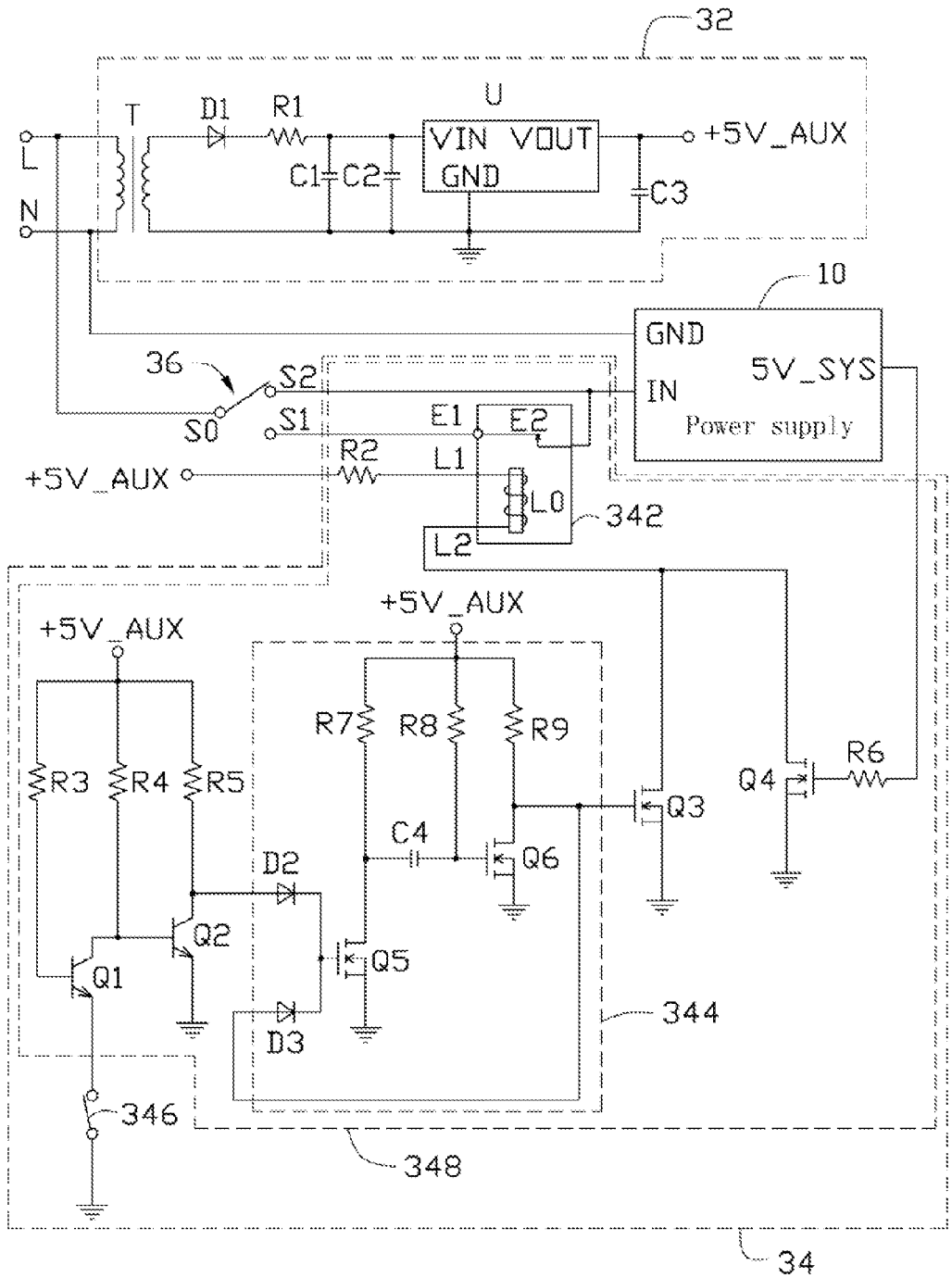
FIG. 2 is a circuit diagram of the energy-saving circuit of FIG. 1.

Referring to FIG. 2, the voltage rectifying circuit 32 includes a transformer T, a first diode D1, a first resistor R1, first to third capacitors C1-C3, and a regulator U. A first terminal of a primary coil of the transformer T is connected to a hot line L of the AC power source 20. A second terminal of the primary coil of the transformer T is connected to a neutral line N of the AC power source 20. A first terminal of a secondary coil of the transformer T is connected to an anode of the first diode D1. A second terminal of the secondary coil of the transformer T is grounded. A cathode of the first diode D1 is connected to a first terminal of the resistor R1. A second terminal of the resistor R1 is connected to a voltage input terminal VIN of the regulator U. The first and second capacitors C1 and C2 are connected in parallel between the voltage input terminal VIN of the regulator U and ground. A ground terminal of the regulator U is grounded. A voltage output terminal VOUT of the regulator U is used to output a 5 volt (V) first voltage +5V_AUX. The third capacitor C3 is connected between the voltage output terminal VOUT and ground.

In other embodiments, the first resistor R1 and first to third capacitors C1-C3 can be omitted. The cathode of the first diode D1 is connected to the voltage input terminal VIN of the regulator U directly.

The energy-saving switch circuit 34 includes a trigger switch 346 and a switch control circuit 348. The switch control circuit 348 includes a relay 342, first to fourth transistors Q1-Q4, second to sixth resistors R2-R6, and a signal stabilization circuit 344.

The signal stabilization circuit 344 includes second and third diodes D2 and D3, fifth and sixth transistors Q5 and Q6, a fourth capacitor C4, and seventh to ninth resistors R7-R9.

A first terminal L1 of a coil L0 of the relay 342 is connected to the voltage output terminal VOUT of the regulator U of the voltage rectifying circuit 32 through the second resistor R2, to receive the first voltage +5V_AUX. A second terminal L2 of the coil L0 of the relay 342 is connected to first terminals of the third and fourth transistors Q3 and Q4. A first contact E1 of the relay 342 is connected to a first connection point S1 of the SPDT switch 36. A second contact E2 of the relay 342 is connected to a second connection point S2 of the SPDT switch 36 and the input terminal IN of the power supply 10. A control point S0 of the SPDT switch 36 is connected to the hot line L of the AC power source 20. The switch unit 36 can selectively connect the first or second connection point S1 or S2 to the control point S0. The neutral line N of the AC power source 20 is connected to a ground terminal GND of the power supply 10. A control terminal of the first transistor Q1 is connected to the voltage output terminal VOUT of the regulator U through the resistor R3 to receive the first voltage +5V_AUX. A first terminal of the first transistor Q1 is connected to the voltage output terminal VOUT of the regulator U through the resistor R4, and connected to a control terminal of the second transistor Q2. A second terminal of the first transistor Q1 is grounded through the trigger switch 346. A first terminal of the second transistor Q2 is connected to the voltage output terminal VOUT of the regulator U through the resistor R5, and connected to an anode of the second diode D2. A second terminal of the second transistor Q2 is grounded. A cathode of the second diode D2 is connected to a control terminal of the fifth transistor Q5, and connected to a cathode of the third diode D3. A first terminal of the fifth transistor Q5 is connected to the voltage output terminal VOUT of the regulator U through the seventh resistor R7, and connected to a control terminal of the sixth transistor Q6 through the capacitor C4. A second terminal of the fifth transistor Q5 is grounded. The control terminal of the sixth transistor Q6 is also connected to the voltage output terminal VOUT of the regulator U1 through the resistor R8. A first terminal of the sixth transistor Q6 is connected to the voltage output terminal of the regulator U through the ninth resistor R9, and connected to an anode of the third diode D3. A second terminal of the sixth transistor Q6 is grounded. A control terminal of the third transistor Q3 is connected to the first terminal of the sixth transistor Q6. A control terminal of the fourth transistor Q4 is connected to the system voltage output terminal 5V_SYS of the power supply 10 through the sixth resistor R6.

In the embodiment, the first and second transistors Q1 and Q2 are npn transistors. The third to sixth transistors are n-channel field effect transistors (FETs). The control terminals, the first terminals, and the second terminals of the first and second transistors Q1 and Q2 are respectively bases, collectors, and emitters of the npn transistors Q1 and Q2. The control terminals, the first terminals, and the second terminals of the third to sixth transistors Q3-Q6 are respectively gates, drains, and sources of the n-channel FETs.

In other embodiments, the first and second transistors can be pnp transistors or FETs. The third to six transistors can be p-channel FETs. The switch unit 36 can be omitted, and the hot line L connected to the switch unit 36 is connected to the first contact E1 of the relay 342 directly.

When the computer system 200 is powered off, and the switch unit 36 is selected to connect the control point S0 to the second connection point S2, the AC power source 20 is connected to the input terminal IN of the power supply 10 directly. The power supply 10 is at a normal work status. That is, when the computer system 200 is powered off, a standby power terminal of the power supply 10 still outputs a 5V standby voltage. In this powered off state, and the switch unit 36 is selected to connect the control point S0 to the first connection point S1, the AC power source 20 is connected to the energy-saving switch circuit 30. The power supply 10 is at an energy-saving status. That is, when the computer system 200 is powered off, the standby power terminal of the power supply 10 does not output the 5V standby voltage.

When the power supply 10 is at the energy-saving status, a work principle of the power supply system 100 is described as follow. The computer system 200 is powered off, the system voltage output terminal 5V_SYS of the power supply 10 does not output a system voltage. The fourth transistor Q4 is turned off. When the trigger switch 346 is not triggered. The first transistor Q1 is turned off. The second transistor Q2 is turned on. The second diode D2 is turned off. The fifth transistor Q5 is turned off. The sixth transistor Q6 is turned on. The third diode D3 is turned off. The third transistor Q3 is turned off. There is no current passing through the coil L0 of the relay 342. The first contact E1 of the relay 342 is disconnected from the second contact E2 of the relay 342. The power supply 10 is disconnected from the AC power source 20. The standby voltage terminal of the power supply 10 does not output the standby voltage. The power supply 10 is at the energy-saving status.

When the computer system 200 at the energy-saving status needs to be powered on, the trigger switch 346 needs to be triggered. The second terminal of the first transistor Q1 is grounded for a moment. The first transistor Q1 is turned on. The second transistor Q2 is turned off. The second diode D2 is turned on. The fifth transistor Q5 is turned on. The sixth transistor Q6 is turned off. The third transistor Q3 is turned on. The third diode D3 is turned on to keep the fifth transistor Q5 being turned on. There is current passing through the coil L0 of the relay 342. The first contact E1 of the relay 342 is connected to the second contact E2 of the relay 342. The power supply 10 is connected to the AC power source 20. The standby power terminal of the power supply 10 outputs the standby voltage to supply a turn on voltage for the computer system 200. When a power-on button of the computer system 200 is pressed, the computer system 200 can be powered on. The system voltage output terminal 5V_SYS of the power supply 10 outputs the system voltage to the fourth transistor Q4. The fourth transistor Q4 is turned on to continue keeping the first contact E1 being connected to the second contact E2 of the relay 342, to keep the AC power source 20 being connected to the power supply 10.

In the embodiment, the second terminal of the first transistor Q1 is disconnected from the ground after the trigger switch 346 is triggered further for a moment, the third transistor Q3 is only turned on for a moment. The third diode D3 needs to keep the third transistor Q3 being turned on. In other embodiments, if the trigger switch 346 can be triggered for a long time, the signal stabilization circuit 344 can be omitted, and the control terminal of the third transistor Q3 is connected to the first terminal of the second transistor Q2 directly.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A power supply system to save energy for a computer system, the power supply system comprising:
   a power supply comprising an input terminal, and a system voltage output terminal; and
   an energy-saving circuit connected between the input terminal of the power supply and an alternating current (AC) power source, the energy-saving circuit comprising:
   a switch control circuit connected between the AC power source and the input terminal of the power supply, and connected to the system voltage output terminal of the power supply;
   a voltage rectifying circuit connected between the AC power source and the switch control circuit to rectify an AC voltage into a direct current (DC) voltage to power the switch control circuit; and
   a trigger switch connected to the switch control circuit; wherein when the computer system is powered off, the system voltage terminal of the
   power supply fails to output a system voltage, and the trigger switch fails to be triggered, the switch control circuit disconnects the input terminal of the power supply from the AC power source, wherein when the computer system is powered off, the system voltage terminal of the power supply fails to output a system voltage, and when the trigger switch is triggered, the switch control circuit connects the input terminal of the power supply to the AC power source;
   the energy-saving circuit further comprises a switch unit, the switch unit is connected between the AC power source and the switch control circuit, the switch unit is also connected between the AC power source and the input terminal of the power supply, the switch unit is used to selectively connect the AC power source to the input terminal of the power supply or connect the AC power source to the switch control circuit, wherein when the switch unit connects the AC power source to the switch control circuit and the computer system is powered off, the trigger switch fails to be triggered, the switch control circuit disconnects the AC power source from the input terminal of the power supply, when the trigger switch is triggered, the switch control circuit connects the AC power source to the input terminal of the power supply;

the switch control circuit comprises a relay, and first to fourth transistors, a control terminal of the first transistor is connected to a voltage output terminal of the voltage rectifying circuit, a first terminal of the first transistor is connected to the voltage output terminal of the voltage rectifying circuit, and connected to a control terminal of the second transistor, a second terminal of the first transistor is grounded through the trigger switch, a first terminal of the second transistor is connected to the voltage output terminal of the voltage rectifying circuit, and connected to a control terminal of the third transistor, a second terminal of the second transistor is grounded, a first terminal of the third transistor is connected to a first terminal of a coil of the relay, a second terminal of the third transistor is grounded, a control terminal of the fourth transistor is connected to the system voltage output terminal of the power supply, a first terminal of the fourth transistor is connected to the first terminal of the coil of the relay, a second terminal of the fourth transistor is grounded, a second terminal of the coil of the relay is connected to the voltage output terminal of the voltage rectifying circuit, a first contact of the relay is connected to the switch unit, a second contact of the relay is connected to the input terminal of the power supply, wherein when the switch unit connects the AC power supply to the switch control circuit, and the trigger switch fails to be triggered, the first transistor is turned off, the second transistor is turned on, the third transistor is turned off, the first contact is disconnected from the second contact of the relay, the input terminal of the power supply is disconnected from the AC power source, the fourth transistor is turned off, wherein when the switch unit connects the AC power supply to the switch control circuit, and the trigger switch is triggered, the first transistor is turned on, the second transistor is turned off, the third transistor is turned on, the first contact is connected to the second contact of the relay, the input terminal of the power supply is connected to the AC power source, the fourth transistor is turned on to keep the input terminal of the power supply being connected to the AC power source.

2. The power supply system of claim 1, wherein the switch control circuit further comprises a first diode, a second diode, a fifth transistor, and a sixth transistor, an anode of the first anode is connected to the first terminal of the second transistor, a cathode of the first diode is connected to a control terminal of the fifth transistor, and connected to a cathode of the second diode, an anode of the second diode is connected to a first terminal of the sixth transistor, the first terminal of the fifth transistor is connected to a control terminal of the sixth transistor through a capacitor, and connected to the voltage output terminal of the voltage rectifying circuit, a second terminal of the fifth transistor is grounded, a second terminal of the sixth transistor is grounded, a first terminal of the sixth transistor is connected to the control terminal of the third transistor.

3. The power supply system of claim 2, wherein the first and second transistors are npn transistors, the third to sixth transistors are n-channel filed effect transistors (FETs), the control terminals, the first terminals, and the second terminals of the first and second transistors are bases, collectors, and emitters of the npn transistors, respectively, the control terminals, the first terminals, and the second terminals of the third to sixth transistors are gates, drains, and sources of the n-channel FETs, respectively.

4. The power supply system of claim 1, wherein the voltage rectifying circuit comprises a transformer, a diode, and a regulator, a primary coil of the transformer is connected to the AC power source, a first terminal of a secondary coil of the transformer is connected to an anode of the diode, a cathode of the third diode is connected to a voltage input terminal of the regulator, a ground terminal of the regulator is grounded, a voltage output terminal of the regulator is connected to the switch control circuit.

5. An energy-saving circuit for a power supply of a computer system, the energy-saving circuit comprising:

an energy-saving circuit connected between an input terminal of the power supply and an alternating current (AC) power source, the energy-saving circuit comprising:

a switch control circuit connected between the AC power source and the input terminal of the power supply, and connected to a system voltage output terminal of the power supply; a voltage rectifying circuit connected between the AC power source and the switch control circuit to rectify an AC voltage into a direct current (DC) voltage to power the switch control circuit; and a trigger switch connected to the switch control circuit;

wherein when the computer system is powered off, the system voltage terminal of the power supply fails to output a system voltage, and the trigger switch fails to be triggered, the switch control circuit disconnects the input terminal of the power supply from the AC power source, when the computer system is powered off, the system voltage terminal of the power supply fails to output a system voltage, and the trigger switch is triggered, the switch control circuit connects the input terminal of the power supply to the AC power source;

a switch unit connected between the AC power source and the switch control circuit, wherein the switch unit is also connected between the AC power source and the input terminal of the power supply, the switch unit is used to selectively connect the AC power source to the input terminal of the power supply or connect the AC power source to the switch control circuit, wherein when the switch unit connects the AC power source to the switch control circuit and the computer system is powered off, the trigger switch fails to trigger, the switch control circuit disconnects the AC power source from the input terminal of the power supply, wherein when the trigger switch triggers, the switch control circuit connects the AC power source to the input terminal of the power supply;

the switch control circuit comprises a relay, and first to fourth transistors, a control terminal of the first transistor is connected to a voltage output terminal of the voltage rectifying circuit, a first terminal of the first transistor is connected to the voltage output terminal of the voltage rectifying circuit, and connected to a control terminal of the second transistor, a second terminal of the first transistor is grounded through the trigger switch, a first terminal of the second transistor is connected to the voltage output terminal of the voltage rectifying circuit, and connected to a control terminal of the third transistor, a second terminal of the second transistor is grounded, a first terminal of the third transistor is connected to a first terminal of a coil of the relay, a second terminal of the third transistor is grounded, a control terminal of the fourth transistor is connected to the system voltage output of the power supply, a first terminal of the fourth transistor is connected to the first terminal of the coil of the relay, a second terminal of the fourth transistor is grounded, a second terminal of the coil of the relay is connected to the voltage output terminal of the voltage rectifying circuit, a first contact of the relay is connected to the switch unit, a second contact of the relay is connected to the input terminal of the power supply, when the switch unit connects the AC power supply to the switch control circuit, and the trigger switch fails to be triggered, the first transistor is turned off, the second transistor is turned on, the third transistor is turned off, the first contact is disconnected from the second contact of the relay, the input terminal of the power supply is disconnected from the AC power source, the fourth transistor is turned off, when the switch unit connects the AC power supply to the switch control circuit, and the trigger switch is triggered, the first transistor is turned on, the second transistor is turned off, the third transistor is turned on, the first contact is connected to the second contact of the relay, the input terminal of the power supply is connected to the AC power source, the fourth transistor is turned on to keep the input terminal of the power supply being connected to the AC power source.

6. The energy-saving circuit of claim 5, wherein the switch control circuit further comprises a first diode, a second diode, a fifth transistor, and a sixth transistor, an anode of the first anode is connected to the first terminal of the second transistor, a cathode of the first diode is connected to a control terminal of the fifth transistor, and connected to a cathode of the second diode, an anode of the second diode is connected to a first terminal of the sixth transistor, the first terminal of the fifth transistor is connected to a control terminal of the sixth transistor, and connected to the output terminal of the voltage rectifying circuit, a second terminal of the fifth transistor is grounded, a second terminal of the sixth transistor is grounded, a first terminal of the sixth transistor is connected to the control terminal of the third transistor.

7. The energy-saving circuit of claim 6, wherein the first and second transistors are npn transistors, the third to sixth transistors are n-channel filed effect transistors (FETs), the control terminals, the first terminals, and the second terminals of the first and second transistors are bases, collectors, and emitters of the npn transistors, respectively, the control terminals, the first terminals, and the second terminals of the third to sixth transistors are gates, drains, and sources of the n-channel FETs, respectively.

8. The energy-saving circuit of claim 5, wherein the voltage rectifying circuit comprises a transformer, a diode, and a regulator, a primary coil of the transformer is connected to the AC power source, a first terminal of a secondary coil of the transformer is connected to an anode of the third diode, a cathode of the third diode is connected to a voltage input terminal of the regulator, a ground terminal of the regulator is grounded, a voltage output terminal of the regulator is connected to the switch control circuit.

* * * * *